Feb. 21, 1967   L. BRUEGGEMAN ET AL   3,305,818
SENSOR STRUCTURE
Filed Dec. 23, 1964

INVENTORS
LEO BRUEGGEMAN
WILL TIMM

BY WILLIAM A. KEMMEL JR.
ATTORNEY

United States Patent Office 3,305,818
Patented Feb. 21, 1967

3,305,818
SENSOR STRUCTURE
Leo Brueggeman, Pasadena, and Will Timm, Altadena, Calif., assignors, by mesne assignments, to Electro-Optical Systems, Inc., Pasadena, Calif., a corporation of California
Filed Dec. 23, 1964, Ser. No. 420,697
5 Claims. (Cl. 338—4)

In general, the present invention relates to a sensitive sensor structure which is simply fabricated and mounted onto the body being measured. More particularly, the present invention relates to a sensor which supports its sensor element while substantially protecting it from external stresses on the structure.

In recent years there has been extensive development of transducers adapted to measure physical properties such as force, pressure, acceleration, and temperature by means of strain gauges. Thus, for example, pressure transducers have been developed wherein the pressure is measured by its effect on the resistance of a strain gauge whose resistance in turn is measured, for example, by an electrical bridge circuit. An example of such pressure transducer is described in Wright U.S. Patent No. 3,049,685 issued August 14, 1962. As disclosed in said Wright patent, the development of such transducers was initiated by the discovery that semiconductor strain gauges made up of materials such as silicon or germanium are extremely sensitive to the stress applied thereto. Thus, a semiconductor strain gauge may be up to 75 times more sensitive than the previously used wire strain gauge. Concurrent with the development of such sensitive strain gauges there has been extensive development of miniaturized transducers which can exploit the capabilities of such sensitive strain gauges and be easily mounted on the body being measured. For example, pressure transducers have been developed having a volume of only 2–3 cubic inches and which can be mounted on the body containing the fluid whose pressure is measured by threading a hollow shaft containing the sensing element into a hole about ⅜-inch in diameter. Such sensitive miniaturized transducers have encountered a variety of problems. One of such problems has been the sensitivity of the transducer to external stresses because of the very high sensitivity of the strain gauges. Thus, for example, when the transducer is mounted on the body being measured by having its sensor structure threaded into a hole in such body, the torque exerted on the sensor structure is reflected in the output from the transducer. Similarly, stresses on the transducer casing are also picked up by the sensor element. Because of such sensitivity of the transducer to external stresses, it is customary to utilize precision mounting fixtures when installing such transducers to avoid such external stresses. However, such practice involves the expensive design and fabrication of such mounting fixtures and expensive engineering time in checking them out by trial-and-error methods. When a similar problem was encountered with wire strain gauges, one solution was developed by Warshaw in U.S. Patent No. 2,629,801 issued February 24, 1953. The Warshaw sensor structure involved three parts including a tube coaxially mounted in the bore of a fitting and clamped into place with a bushing. Because of the rigid leakage requirements in the sensor structure of the present invention, such solution obviously could not be applied directly. However, it appeared possible to improve Warshaw's structure by welding the tube directly to the fitting thus eliminating the leakage problem. When such technique was employed, a number of substantial problems were encountered because of the small dimensions of the present invention. One problem was that both the sleeve and its fitting or housing required machining to very close tolerances to insure that when the sleeve was welded to its housing, that clearance was maintained between the sleeve and the housing bore. For example, slight imperfections in either the sleeve or the housing caused the sleeve to tilt sufficiently to contact the housing because of the small clearance therebetween. Another problem involved the proper centering of the sleeve in the housing bore by expedients such as forming a circumferential recess about the housing bore as illustrated by Warshaw or by placing a spacer ring in the housing. Such problem also required the close tolerances already discussed. Still another problem involved the necessity for the various parts to be made out of identical material to prevent internal stresses from developing in the sensor structure. Ordinarily such problem is met simply by forming the parts out of the same source material. However, the parts of the present sensor structure are formed out of bar stock by machining which causes significant work hardening of the part depending on the amount of machining. Consequently, when forming the parts of the sensor structure, the differences in the amount of machining were found to effectively form parts having significantly different characteristics.

Consequently, an object of the present invention is a sensor structure which supports the sensor element of a transducer while substantially protecting it from external stresses on the structure.

Another object of the present invention is an integral sensor structure which avoids the problems of properly fitting parts together and matching their characteristics.

In general, the present invention involves a sensor structure comprising a housing including a cylindrical shaft having an axial bore and adapted to be inserted into the body being measured. The sensor structure also has a sensor element including a sleeve positioned substantially coaxially with and incorporating the housing shaft bore. Such sleeve is integrally joined at its first end to the housing. Mounted over the second end of said sleeve is a diaphragm, and at least one strain gauge is mounted on the diaphragm.

In order to facilitate understanding of the present invention, reference will now be made to the appended drawings of a preferred specific embodiment of the present invention. Such drawings should not be construed as limiting the invention which is properly set forth in the appended claims.

Figure 1:
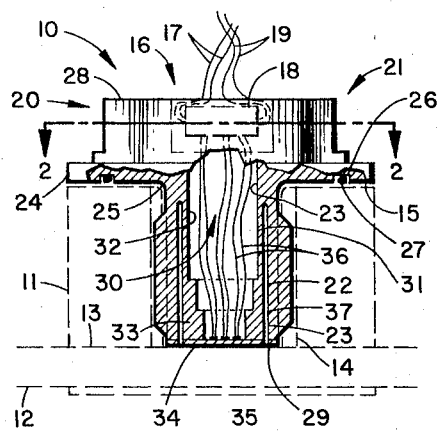
FIG. 1 is a semischematic axial cross-section of the sensor structure of the present invention shown installed in a pressure line with the remainder of the transducer mounted thereon.

As illustrated in FIG. 1, a transducer 10 is mounted on a block 11 which is connected into a fluid conduit 12. The block 11 has a transverse passage 13 formed therein to connect to the adjoining parts of the fluid conduit 12 and an axial threaded passage 14 connecting the transverse passage 13 to the top 15 of the block 11. The transducer 10 also includes an enclosure 16 mounted on a sensor structure 20. The enclosure 16 is adapted to receive the input leads 17 from a power source (not shown) and supports an electrical circuit 18 (shown schematically) adapted to detect variations in resistance in the output from the sensor element 30 and to translate such variations into current variations in the output leads 19 from the transducer 10. A variety of electrical circuits are known which perform the functions of the circuit 18 and they normally include the well-known Wheatstone bridge circuit.

As set forth above, the present invention relates to the sensor structure 20 which comprises a housing 21 and a sensor element 30. The housing 21 is adapted to be inserted into the body being measured such as the body 11 and comprises a cylindrical shaft 22 adapted to be inserted in the axial passage 14 of the body 11. Thus, the shaft 22 has external threads which are engaged with the threads of the axial passage 14 of the body 11. The shaft 22 has an axial bore 23 and an outwardly extending flange 24 on its outer end 25 which is adapted to make sealing contact with the upper surface 15 of the block 11. Thus, the flange 24 has a circumferential channel 26 in its inner surface which is adapted to receive a V-cross-section metal O-ring 27. In addition, an elastomeric O-ring may be mounted on the shaft 22 adjacent to the flange 24 to insure sealing against leakage. Mounted coaxially with the shaft 22 on the flange 24 is a collar 28 which forms the enclosure 16. The inner end 29 of the shaft 22 extends adjacent to the transverse passage 13.

Figure 2:
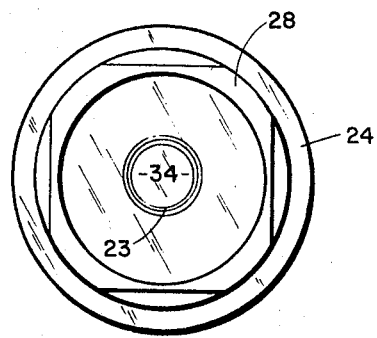
FIG. 2 is a cross-sectional view of FIG. 1 taken along the lines 2—2 of FIG. 1.

The sensor element 30 is mounted on the housing 20 and is accessible from the exterior of the housing 20 and the body 11. Thus, as illustrated in FIGS. 1 and 2, the sensor element 30 is positioned substantially coaxially with the bore 23 of the shaft 22. The sensor element 30 comprises a sleeve 31 incorporating the shaft bore 23 at its first end 32 and integrally joined to the shaft 22, adjacent to its outer end 25. The sleeve 31 is attached to the shaft 22 above the threaded portion of the shaft 22. Mounted over the second end 33 of the sleeve 31 is a diaphragm 34 which is substantially flush with the inner end 29 of the shaft 22. The wall of the sleeve 31 is approximately as thick as the diaphragm 34 and preferably twice as thick to insure a structural strength at least equal to the diaphragm. The diaphragm 34 has four strain gauges 35 mounted on its upper surface which form the four legs of the Wheatstone bridge in the circuit 18 by means of leads 36. The sleeve 31 is formed by a circumferential groove 37 in the inner end 29 of the shaft 22 and coaxial with the shaft 22. The groove 37 extends adjacent to the outer end 25 of the shaft 22 past its threaded portion. Also, the width of the groove 37 is very narrow, preferably about 0.005–0.006 inch to minimize the overall diameter of the shaft 22.

Figure 3:
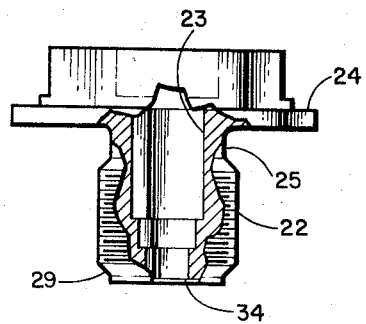
FIG. 3 is an axial cross-section of the sensor structure of FIG. 1 at an intermediate step in the method of producing it.

The preferred method of forming the sensor structure 20 of the present invention is illustrated in FIG. 3. Thus, initially the housing 21 is formed having a cylindrical shaft 22 with an axial bore 23. The diaphragm 34 is then mounted over the inner end 29 of the shaft 22 as illustrated in FIG. 3. Then, the groove 37 is cut into the inner end of the shaft 22 to form the sleeve 31 positioned coaxially with and incorporating the shaft bore 23 and integrally joined to the shaft 22. Such narrow, deep, circumferential groove may be cut by the spark erosion method using an electrical discharge machine or by ultrasonic means.

Many other specific embodiments of the present invention will be obvious to one skilled in the art in view of this disclosure. For example, the sensor element may be positioned internally in the housing of the sensor structure or extend externally therefrom.

There are many features in the present invention which clearly show the significant advance the present invention represents over the prior art. Consequently, only a few of the more outstanding features will be pointed out to illustrate the unexpected and unusual results obtained by the present invention. One feature of the present invention is a sensor structure which supports its sensor element while substantially protecting it from external stresses on the structure. Thus, for example, when the sensor structure of the present invention is mounted onto a body by using a wrench, the torque exerted on the sensor structure by the wrench is transferred essentially only to the housing of the sensor structure and does not affect the strain gauges on the sensor element. Similarly, any off-axis loading on the transducer as a whole is received in the main body of the transducer and the housing of the sensor structure without interfering with the pressure sensing operation of the diaphragm. In effect, the sensor element floats in the center of the housing substantially without being affected by the stresses being applied to the housing. Another feature of the present invention is the formation of an integral sensor element from a one-piece housing. Thus, by forming a sleeve in the bore of the housing by cutting a deep circumferential groove in the housing, the problems associated with a precision welding operation and the machining and positioning of a separate sleeve in the housing are avoided.

It will be understood that the foregoing description and examples are only illustrative of the present invention and it is not intended that the invention be limited thereto. All substitutions, alterations, and modifications of the present invention which come within the scope of the following claims or to which the present invention is readily susceptible without departing from the spirit and scope of this disclosure are considered part of the present invention.

We claim:
1. A simple, sensitive sensor structure which supports its sensor element while substantially protecting it from external stresses on the structure comprising:
   (a) a housing including a cylindrical shaft having an outer end and an inner end and said inner end is adapted to be inserted into a body being measured, said shaft having an axial bore therethrough; and,
   (b) a sensor element including a sleeve positioned substantially coaxially with and integrally joined at its first end to said shaft, said sleeve and the inner portion of said shaft bore being formed from a single body by a circumferential groove in the inner end of said shaft, a diaphragm mounted over the second end of said sleeve, and at least one strain gauge mounted on the upper surface of said diaphragm.

2. A sensor structure as stated in claim 1 wherein the inner end of said housing shaft has external threads.

3. A sensor structure as stated in claim 1 wherein said sleeve is joined adjacent to the outer end of said shaft.

4. A sensor structure as stated in claim 1 wherein said diaphragm is substantially flush with the inner end of said shaft.

5. A sensor structure as stated in claim 1 wherein the entire wall of said sleeve is at least as thick as said diaphragm.

References Cited by the Examiner

UNITED STATES PATENTS

| 2,472,045 | 5/1949 | Gibbons | 338—4 X |
| 2,627,749 | 2/1953 | Li | 338—4 X |
| 2,629,801 | 2/1953 | Warshaw | 338—4 |
| 2,940,313 | 6/1960 | Li | 338—36 X |
| 3,244,006 | 4/1966 | Delmonte. | |

RICHARD M. WOOD, *Primary Examiner.*

W. D. BROOKS, *Assistant Examiner.*